(12) United States Patent
Hosoda

(10) Patent No.: US 10,901,662 B2
(45) Date of Patent: Jan. 26, 2021

(54) COMMUNICATION APPARATUS, METHOD OF CONTROLLING THE SAME, AND STORAGE MEDIUM

(71) Applicant: CANON KABUSHIKI KAISHA, Tokyo (JP)

(72) Inventor: Yasuhiro Hosoda, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/788,595

(22) Filed: Feb. 12, 2020

(65) Prior Publication Data

US 2020/0183626 A1 Jun. 11, 2020

Related U.S. Application Data

(63) Continuation of application No. 15/944,931, filed on Apr. 4, 2018, now Pat. No. 10,599,368, which is a
(Continued)

(30) Foreign Application Priority Data

Apr. 10, 2015 (JP) ................................ 2015-081232

(51) Int. Cl.
*G06F 3/12* (2006.01)
*H04N 1/00* (2006.01)
(Continued)

(52) U.S. Cl.
CPC ............ *G06F 3/1204* (2013.01); *G06F 3/128* (2013.01); *G06F 3/1236* (2013.01);
(Continued)

(58) Field of Classification Search
CPC ... H04W 12/08; H04W 12/003; H04W 48/10; H04W 88/08; H04W 24/02; H04W 84/12;
(Continued)

(56) References Cited

U.S. PATENT DOCUMENTS 8,576,846 B2 11/2013 Kumar et al.
8,693,038 B2 4/2014 Suzuki
(Continued)

FOREIGN PATENT DOCUMENTS

CN 101278522 A 10/2008
CN 102196418 A 9/2011
(Continued)

OTHER PUBLICATIONS

European Search Report dated Aug. 18, 2016, in corresponding European Patent Application No. 16157317.5.
(Continued)

*Primary Examiner* — Allen H Nguyen
(74) *Attorney, Agent, or Firm* — Venable LLP

(57) ABSTRACT

A communication apparatus is equipped with a direct wireless communication function for executing a direct wireless communication with an external apparatus without a relay apparatus. Executed instructions cause the information processing apparatus to perform operations includes specifying a user who logs into the communication apparatus, and executing a direct wireless communication function. An SSID of a plurality of SSIDs including at least an SSID of a first type corresponding to the user who logs into the communication apparatus and an SSID of a second type being different from the SSID of the first type is able to be used in the direct wireless communication function. In a case that the SSID of the first type is used in the direct wireless communication function, an SSID corresponding to the specified user is used in the executed direct wireless communication function.

17 Claims, 11 Drawing Sheets

Related U.S. Application Data continuation of application No. 15/082,741, filed on Mar. 28, 2016, now Pat. No. 9,965,225.

(51) Int. Cl.

| | | |
|---|---|---|
| H04N 1/32 | (2006.01) |
| H04N 1/44 | (2006.01) |
| H04L 29/08 | (2006.01) |
| H04N 1/327 | (2006.01) |
| H04W 48/10 | (2009.01) |
| H04W 12/08 | (2009.01) |
| H04W 12/00 | (2009.01) |
| H04W 88/08 | (2009.01) |
| H04W 24/02 | (2009.01) |
| H04W 84/12 | (2009.01) |

(52) U.S. Cl.
CPC .......... *G06F 3/1292* (2013.01); *H04L 67/306* (2013.01); *H04N 1/00307* (2013.01); *H04N 1/32117* (2013.01); *H04N 1/32765* (2013.01); *H04N 1/4413* (2013.01); *H04N 1/4433* (2013.01); *H04W 12/003* (2019.01); *H04W 12/08* (2013.01); *H04W 48/10* (2013.01); H04N 2201/0041 (2013.01); H04N 2201/0055 (2013.01); H04N 2201/0094 (2013.01); H04N 2201/3205 (2013.01); H04W 24/02 (2013.01); H04W 84/12 (2013.01); H04W 88/08 (2013.01)

(58) Field of Classification Search
CPC .............. H04L 67/306; H04N 1/00307; H04N 1/32117; H04N 1/32765; H04N 1/4413; H04N 1/4433; H04N 2201/0041; H04N 2201/0055; H04N 2201/0094; H04N 2201/3205
USPC ....................................... 358/1.15
See application file for complete search history.

(56) References Cited

U.S. PATENT DOCUMENTS

| | | |
|---|---|---|
| 8,922,820 B2 | 12/2014 | Asai |
| 8,942,130 B2 | 1/2015 | Kumar et al. |
| 8,942,133 B2 | 1/2015 | Kumar et al. |
| 8,958,402 B2 | 2/2015 | Ota et al. |
| 2005/0088681 A1 | 4/2005 | Hosoda |
| 2010/0142502 A1 | 6/2010 | Shiraki |
| 2010/0182959 A1 | 7/2010 | Cook et al. |
| 2010/0274859 A1 | 10/2010 | Bucuk |
| 2011/0126270 A1 | 5/2011 | Sato et al. |
| 2011/0222518 A1 | 9/2011 | Ota et al. |
| 2011/0244798 A1 | 10/2011 | Daigle et al. |
| 2012/0008529 A1 | 1/2012 | Averbuch et al. |
| 2012/0194863 A1* | 8/2012 | Oshima ................ G06F 3/126 358/1.15 |
| 2012/0239916 A1 | 9/2012 | Malasani |
| 2013/0250358 A1 | 9/2013 | Suzuki |
| 2013/0258402 A1* | 10/2013 | Arai ................ G06K 15/40 358/1.15 |
| 2013/0272224 A1 | 10/2013 | Ogawara |
| 2013/0283050 A1 | 10/2013 | Gupta et al. |
| 2013/0309971 A1* | 11/2013 | Kiukkonen ......... H04W 12/003 455/41.2 |
| 2013/0341396 A1 | 12/2013 | Tung |
| 2014/0031078 A1 | 1/2014 | Nishikawa |
| 2014/0169219 A1 | 6/2014 | Suzuki |
| 2014/0189808 A1 | 7/2014 | Mahaffey et al. |
| 2014/0268231 A1 | 9/2014 | Ito |
| 2014/0366101 A1 | 12/2014 | Murata |
| 2015/0040204 A1 | 2/2015 | Smales |
| 2015/0092607 A1 | 4/2015 | Ando |
| 2015/0093992 A1* | 4/2015 | Tanaka ................ H04B 5/0031 455/41.2 |
| 2015/0110100 A1 | 4/2015 | Ota et al. |
| 2015/0223068 A1* | 8/2015 | Thelen .................... H04L 63/06 726/7 |
| 2015/0350905 A1 | 12/2015 | Suzuki |
| 2016/0006739 A1* | 1/2016 | Huang ................ H04W 12/003 726/5 |
| 2016/0044719 A1* | 2/2016 | Sidhu ...................... H04W 4/00 370/329 |
| 2016/0119284 A1* | 4/2016 | Kim .................. H04W 12/0023 726/12 |
| 2016/0255661 A1 | 9/2016 | Siraj et al. |

FOREIGN PATENT DOCUMENTS

| | | |
|---|---|---|
| CN | 102714760 A | 10/2012 |
| CN | 102833751 A | 12/2012 |
| EP | 2219412 A2 | 8/2010 |
| EP | 2495961 A1 | 9/2012 |
| JP | 2006-123239 A | 5/2006 |
| JP | 2014-007634 A | 1/2014 |
| JP | 2014-195150 A | 10/2014 |
| JP | 2015-023481 A | 2/2015 |
| JP | 2016-181775 A | 10/2016 |
| WO | 2011/052813 A1 | 5/2011 |
| WO | 2013184433 A1 | 12/2013 |

OTHER PUBLICATIONS

Japanese Office Action dated Mar. 10, 2017, in corresponding Japanese Patent Application No. 2015-081232.
Chinese Office Action dated May 28, 2018, in corresponding Chinese Patent Application No. 201610212663.9 (with English translation).
Korean Office Action dated Jul. 30, 2018, in related Korean Patent Application No. 10-2016-0040794.
Chinese Office Action dated Jan. 28, 2019, in related Chinese Patent Application No. 201610212663.9.
Japanese Office Action dated Jun. 7, 2019, in related Japanese Patent Application No. 2017-122470.

* cited by examiner

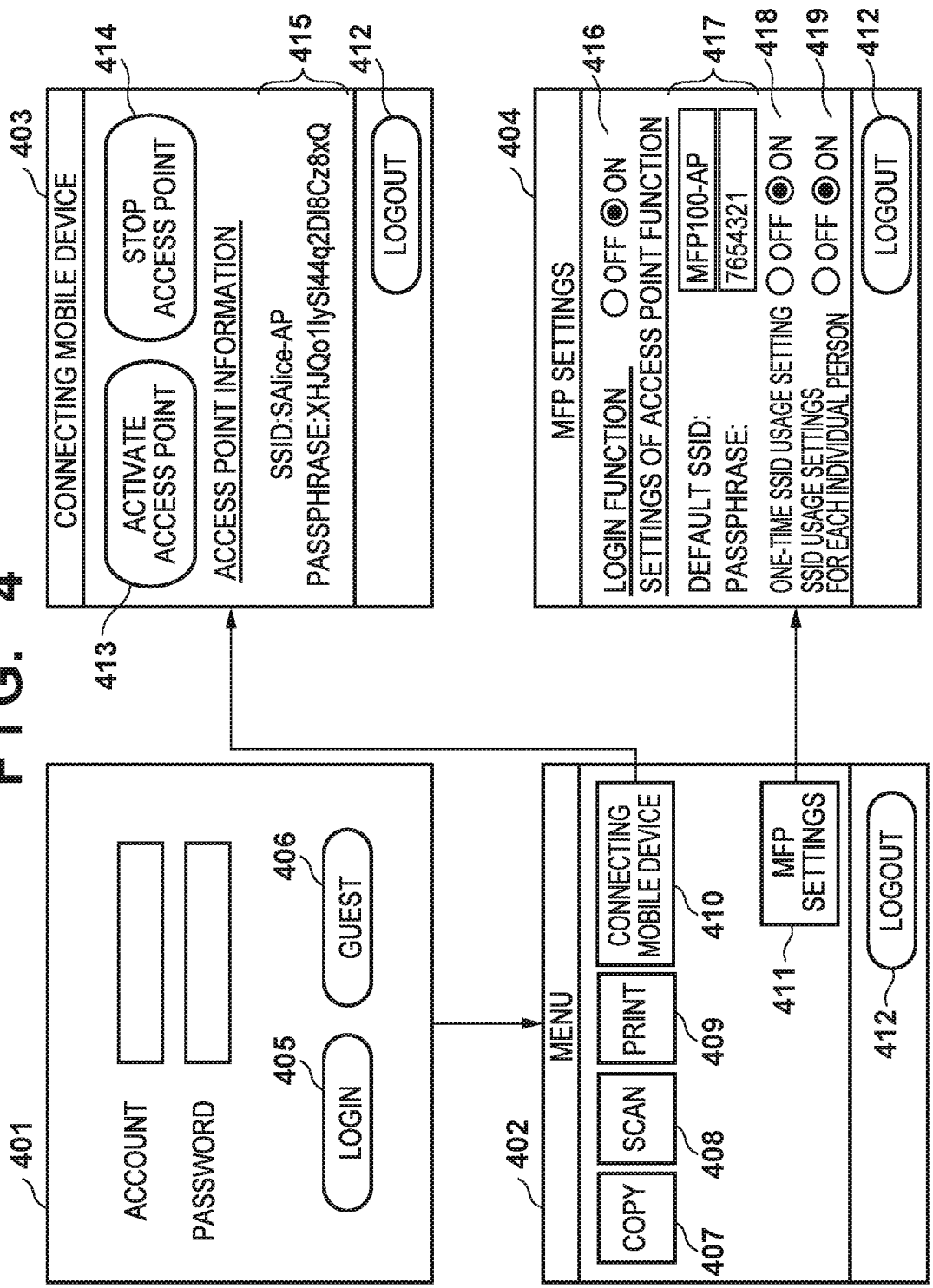

ized. For this reason, frequently changing
COMMUNICATION APPARATUS, METHOD OF CONTROLLING THE SAME, AND STORAGE MEDIUM This application is a continuation of application Ser. No. 15/944,931, filed Apr. 4, 2018, which is a continuation of application Ser. No. 15/082,741, filed Mar. 28, 2016.

BACKGROUND OF THE INVENTION

Field of the Invention

The present invention relates to a communication apparatus, a method of controlling the same, and a storage medium.

Description of the Related Art

A printer having a wireless LAN (Local Area Network) access point function of an IEEE 802.11 standard is known (for example, Japanese Patent Laid-Open No. 2006-123239). When using such a printer, it is possible to use the printing function by directly connecting to the access point that the printer is equipped with from a terminal such as a personal computer, a smart phone, or a tablet. In addition, as wireless LAN encryption method standards, WPA (Wi-Fi Protected Access), WPA2 (WPA (Wi-Fi Protected Access 2)), and the like are known. When connecting to a wireless LAN access point in which these encryption functions are enabled, a passphrase as is known by WPA-PSK (Wi-Fi Protected Access Pre-Shared Key), WPA2-PSK (Wi-Fi Protected Access 2 Pre-Shared Key), or the like is necessary. In addition, a terminal that uses an access point having a function in which it stores in advance the passphrase and an SSID (Service Set Identifier) for when connecting to the access point, and automatically connects when it discovers an access point that it succeeded in connecting to in the past is commonly known.

However, although a printer equipped with the above-described access point can be used in a home or in an office in which there is a small number of users, who are employees or the like, there are problems such as the following in the case of use in a large scale office in which there are many users. For example, if the SSID and passphrase of an access point that a printer has are fixed, when a terminal that has connected to the access point discovers the access point, the terminal automatically connects to the access point regardless of the intention of the user of the terminal. Typically, a number of terminals that can simultaneously connect to an access point that a printer has is small. For this reason, when there are many terminals that automatically connect in an office, there is a possibility that an access point is instantly connected to from a plurality of terminals when it activates, and a maximum number of connections that can simultaneously connect to the access point is reached. In such a case, the terminals that connect to the access point first monopolize the access point, and a terminal of another user who wants to use the printer becomes unable to connect to the access point. To avoid such a problem, frequently changing the SSID or passphrase of the access point that the printer is equipped with can be considered. However, with such a configuration, there is a problem in that a user who uses the printer must change the settings of the user's terminal each time the SSID and the passphrase of the access point are changed, and effort for the user increases.

SUMMARY OF THE INVENTION

An aspect of the present invention is to eliminate the above-mentioned problems with conventional technology.

A feature of the present invention is to provide a technique by which a communication apparatus obtains an SSID corresponding to a user, and then the communication apparatus uses the SSID to operate in a direct wireless communication mode.

The present invention in its first aspect provides a communication apparatus comprising: a wireless communication unit equipped with a direct wireless communications function configured to execute wireless communication between an external apparatus and the communication apparatus; a specifying unit configured to specify a user of the communication apparatus; and a generation unit configured to generate an SSID, to use in the direct wireless communications function, by using at least user information of the user specified by the specifying unit.

The present invention in its second aspect provides a communication apparatus comprising: a wireless communication unit equipped with a direct wireless communications function configured to execute wireless communication between an external apparatus and the communication apparatus; a storage unit configured to store an SSID, used by the direct wireless communications function, in correspondence with user information of a user; a specifying unit configured to specify a user of the communication apparatus; and a selection unit configured to select, from a plurality of SSIDs stored in the storage unit, an SSID that corresponds to user information of the user specified by the specifying unit, wherein the wireless communication unit uses the SSID selected by the selection unit to execute the direct wireless communications function.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 depicts a view illustrating an example of screen transitions and user interfaces displayed on a console unit of the MFP according to the first embodiment.

FIG. 7 depicts a view for explaining an algorithm by which an SSID and a passphrase are generated by the MFP according to the first embodiment from information of a user who has logged-in.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

First Embodiment

Figure 1:
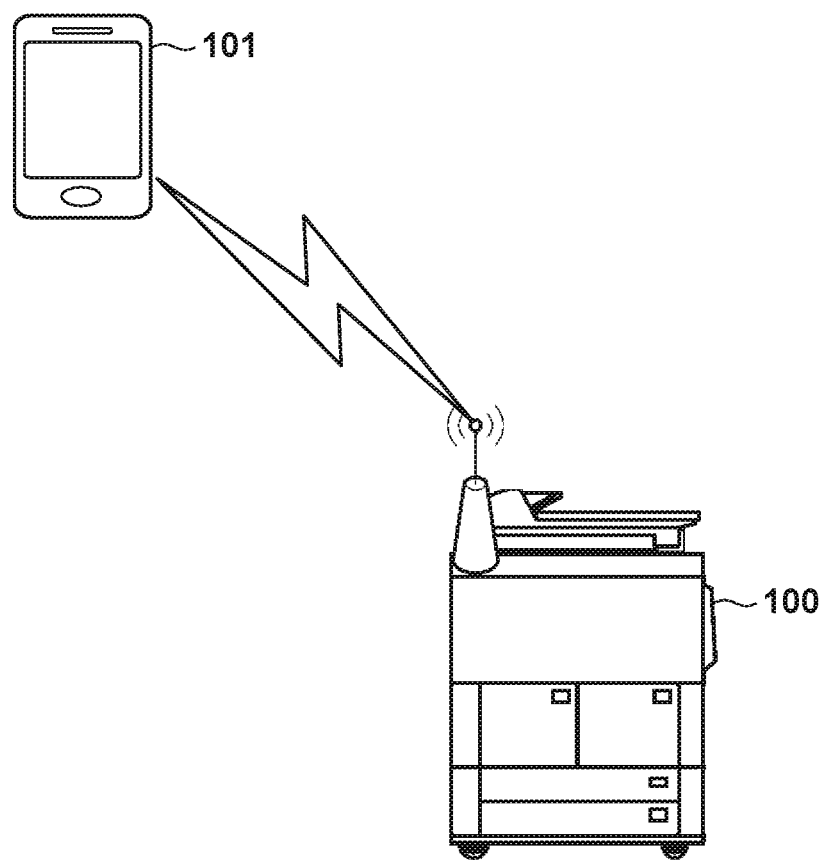
FIG. 1 depicts a schematic view illustrating a configuration of a printing system according to a first embodiment of the present invention.

FIG. 1 depicts a schematic view illustrating a configuration of a printing system according to a first embodiment of the present invention. In an environment in the first embodiment, a plurality of multi-function peripherals (MFP: Multi-Function Peripheral) and a plurality of mobile terminals are present. For example, an office environment in which each user has one mobile terminal and normally walks around holding the mobile terminal is envisioned. A plurality of MFPs are installed in accordance with the office environment. Here, explanation is given of a multi-function peripheral (MFP) as an example of one aspect of a communication apparatus and a printing apparatus of the present invention.

An MFP 100 and a mobile terminal 101 in FIG. 1 are representative examples of the plural MFPs and mobile terminals. The MFP 100 is equipped with a wireless LAN access point function, and can connect to and perform direct communication with the mobile terminal 101, which is connected to the access point.

Figure 2:
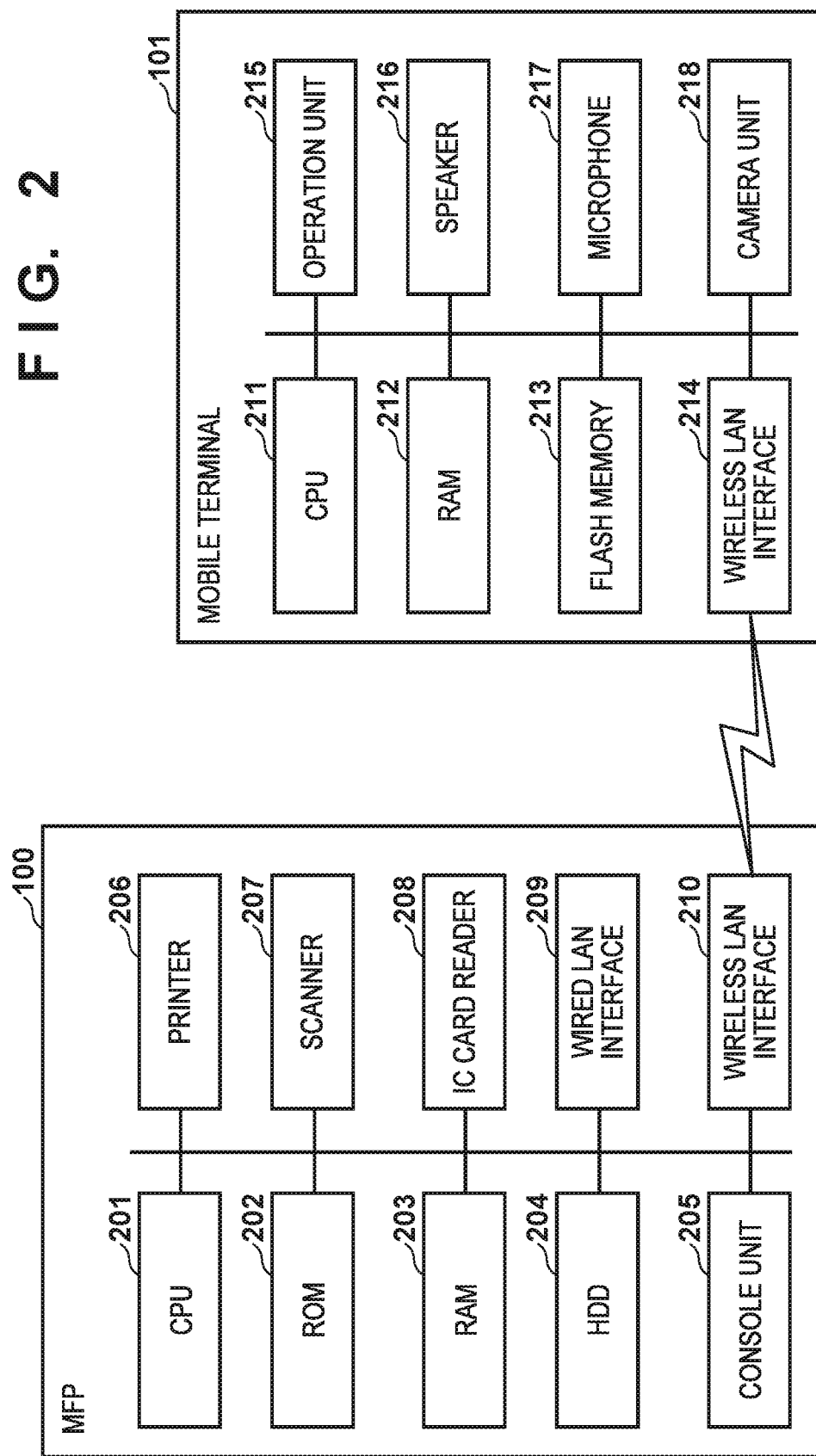
FIG. 2 is a block diagram for explaining a hardware configuration of a mobile terminal and an MFP according to the first embodiment.

FIG. 2 is a block diagram for explaining hardware configurations of the MFP 100 and the mobile terminal 101 according to the first embodiment.

Firstly, explanation is given of a hardware configuration of the MFP 100.

A CPU 201 controls operation of the MFP 100 on the whole. The CPU 201 performs various control, such as reading control or transmission control, by reading a control program that is stored in a ROM 202 or an HDD (hard disk drive) 204, deploying it into a RAM 203, and then executing the deployed program. The RAM 203 is a volatile memory that the CPU 201 uses, for example as a work area for executing various programs. The HDD 204 stores image data, various programs, or the like. A console unit 205 is equipped with a hard key, a display unit that has a function of a touch panel that is operable by a user's finger, or the like. A printer 206 prints an image on a print paper (a sheet) based on image data transferred via an internal bus. A scanner 207 generates image data by reading an image of an original. An IC card reader 208 reads an IC card that is used in authentication of a user. A wired LAN interface 209 is an NIC (Network Interface Card) for connecting to a wired LAN. A wireless LAN interface 210 is an access point for connecting to the MFP 100 from a terminal corresponding to a wireless LAN. These are mutually connected via an internal bus.

Next, explanation is given of a hardware configuration of the mobile terminal 101.

A CPU 211 controls operation of the mobile terminal 101 on the whole. A RAM 212 is a volatile memory that the CPU 211 uses, for example as a work area for executing various programs. A flash memory 213 is a non-volatile memory that stores various programs or data. A wireless LAN interface 214 is an interface for communicating by a wireless LAN, and can perform a wireless communication by connecting to a wireless LAN access point. In the first embodiment, the wireless LAN interface 214 is used to mutually communicate with the MFP 100 after connecting to the wireless LAN interface 210 that the MFP 100 is provided with. An operation unit 215 is a display that operates as a touch panel that is operable by a user's finger. A speaker 216 converts an electrical signal into a sound. A microphone 217 detects a sound and converts it into an electrical signal. A camera unit 218 captures a still image or a moving image, and converts it into electronic data.

Next, referring to FIG. 3, explanation is given of a software configuration of the mobile terminal 101 and the MFP 100 according to the first embodiment.

Figure 3A:
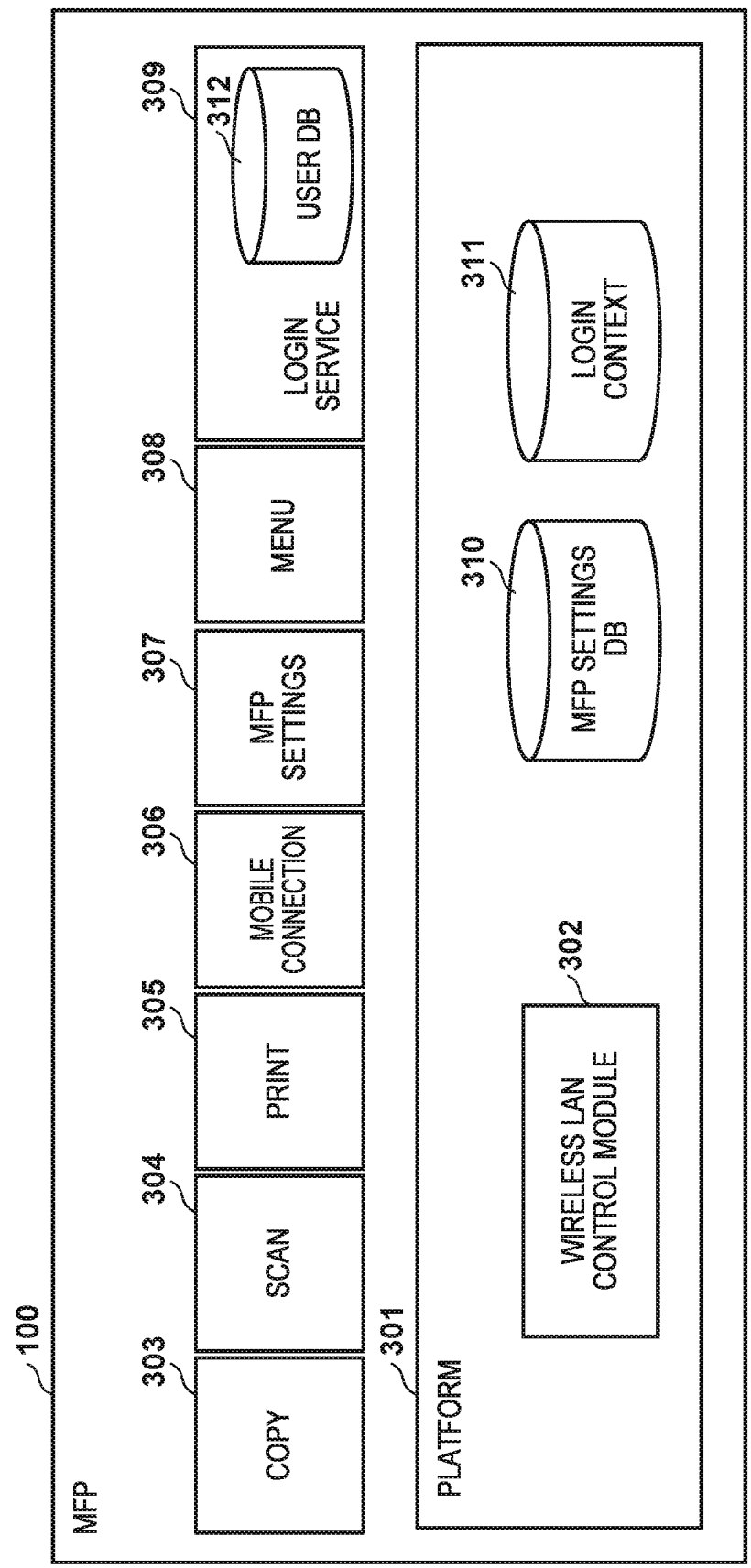
FIG. 3A is a block diagram for describing a software configuration of the MFP according to the first embodiment and a data region in which software is managed.

FIG. 3A is a block diagram for explaining a software configuration of the MFP 100 according to the first embodiment and a data region in which software is managed. Note, a function of software illustrated in FIG. 3A is realized by the CPU 201 executing a program deployed into the RAM 203.

FIG. 4 depicts a view illustrating an example of screen transitions and user interfaces displayed on the console unit 205 of the MFP 100 according to the first embodiment. Below, explanation is given with reference to FIG. 3A and FIG. 4.

A platform 301 is a platform that provides a basic function of software that controls the MFP 100. The platform 301 can be configured in a form that includes, for example, a device driver group, an OSGi framework, a JAVA (registered trademark) virtual machine, and operating system such as Linux or the like. The OSGi framework is a Java-based service platform defined by the OSGi Alliance (a standardization body). The platform 301 is equipped with a device driver group for controlling various hardware, and provides APIs (Application Programming Interface) for using the hardware to applications that operate on the platform. The platform 301 is equipped with a wireless LAN control module 302.

The wireless LAN control module 302 is equipped with a software access point mode in which the wireless LAN interface 210 is activated as a wireless LAN access point. It is also provided with a DHCP (Dynamic Host Configuration Protocol) function that allocates an IP address to a mobile terminal when the mobile terminal connects to the access point which is activated in the software access point mode. In addition, the wireless LAN control module 302 provides an application with an API that performs software access point mode activation/stopping control, and read/writes a passphrase or SSID (identification information) for the access point. Although it is not shown graphically, a printer module that controls the printer 206, and a scanner module that controls the scanner 207 are also present in the platform 301. In addition, the platform 301 provides an application with an API for reading/writing data of an MFP setting database 310 or the like.

Additionally, the above software access point mode is an example of a direct wireless communication mode in which the MFP 100 can operate and in which direct wireless communication with an external apparatus (for example, the mobile terminal 101) is executed without going through an access point. The direct wireless communication mode is not limited to the software access point mode, and may be of another wireless communication method, such as Wi-Fi Direct. When the MFP 100 operates in the direct wireless communication mode, the MFP 100 behaves as an access point.

A copy 303, a scan 304, a print 305, and a mobile connection 306 are examples of applications that operate on the platform 301. These applications display a user interface for providing functions of each kind of application on the console unit 205. For example, the copy 303 provides a function that controls the scanner 207 and the printer 206 via the platform 301 to execute a copy. The scan 304 provides a function that operates the scanner 207, and transmits obtained electronic data externally or stores it to the HDD 204. The print 305 provides a function that displays a print history or an execution status of a print job received from the external unit.

The mobile connection 306 provides a user interface (connecting mobile device screen 403 of FIG. 4) for using the wireless LAN interface 210 in the access point mode. A user can activate a wireless LAN access point in an ad hoc manner by pressing an activate access point button 413 of the connecting mobile device screen 403. At this point, an SSID and a passphrase of a usable access point are displayed on an area 415 of the connecting mobile device screen 403. For example, a user of the mobile terminal 101 can use the MFP 100 from the mobile terminal by using the SSID and passphrase of the access point that are displayed in the area 415 to wirelessly connect the mobile terminal 101 to the wireless LAN interface 210 which is operating in access point mode. If usage of the wireless LAN has ended, a user presses a stop access point button 414 to stop the wireless LAN access point. Thereby the wireless connection with the mobile terminal 101 can be terminated.

MFP settings 307 provides an MFP settings screen 404 (FIG. 4) for an administrator of the MFP 100 to perform setting of the MFP 100. A menu 308 is a module that displays a menu screen 402 (FIG. 4) for selecting a previously explained application from the console unit 205. For example, the menu screen 402 is equipped with an MFP settings button 411 and the like for displaying a screen for setting the MFP 101 and buttons 407-410 that display functions that various applications provide. A login service 309 is provided with a login function and an account management function for a user that uses the MFP 100. The MFP setting database 310 is a database that comprehensively manages settings of the MFP 100 and an application.

It is possible to perform the following settings via the setting screen 404 for the MFP 100 according to the first embodiment. A value set in the setting screen 404 of the MFP 100 is stored in the MFP setting database 310.

ON/OFF of the login function (reference numeral 416 of the MFP settings screen 404 of FIG. 4)

If the login function is set to OFF, the menu screen 402 is displayed without a user performing a login operation, and it is possible to use a function selected in the menu screen.

If the login function is set to ON, the login service 309 displays a login screen 401 (FIG. 4) on the console unit 205. Thus, after performing a login operation via the login screen 401, a user can use the menu screen 402 and a function selected from the menu screen 402.

Setting a default SSID and passphrase of an access point (reference numeral 417 of the MFP settings screen 404 of FIG. 4)

A fixed SSID and passphrase are set for the MFP 100.

Usage setting of a one-time SSID (reference numeral 418 of the MFP settings screen 404 of FIG. 4)

When this setting is ON, a function that activates the access point with a different SSID each time is activated.

Usage setting of an SSID for each individual person (reference numeral 419 of the MFP settings screen 404 of FIG. 4)

When this setting is ON, a function that, in cooperation with the login function, activates the access point with a different SSID for each user is activated.

The login service 309 is provided with a login function and a user account management function explained below.

The user account management function provides a user interface to perform registration and management of a user account to a user, and user information registered via this user interface is stored in a user database 312 and managed. Here the user information that is managed includes a user name, a password, an IC card number, a role, and the like as illustrated in the list of user information of Table 1, for example.

TABLE 1

| User name | Password | IC card number | Role |
| --- | --- | --- | --- |
| Administrator | password0 | 01a1b2c3d4e5f6g0 | Administrator |
| Guest | | | Guest |
| Alice | password1 | 01a1b2c3d4e5f6g1 | Administrator |
| Bob | password2 | 01a1b2c3d4e5f6g2 | General user |
| Carol | password3 | 01a1b2c3d4e5f6g3 | General user |
| Dave | password4 | 01a1b2c3d4e5f6g4 | General user |

The login function provides a login/logout function to a user who uses the console unit 205. Configuration is taken so that the login screen 401 is displayed on the console unit 205, and a user who has not logged-in cannot use the console unit 205. Note that configuration is taken at this point so that a number of users who can simultaneously login to the console unit 205 is set to "1", and that a plurality of users cannot simultaneously login to the console unit 205. If a user has succeeded in logging in, the display of the console unit 205 is caused to transition from the login screen 401 to the menu screen 402, and a state in which the user can use the MFP 100 is entered. Note that, multiple login schemes exist as schemes for performing this login. For example, a login scheme such as below is provided.

Keyboard Log in

A software keyboard is displayed on the login screen 401 of the console unit 205, and when a press of a login button 405 is detected, an input user name (account) and password are obtained to perform user authentication to perform login processing.

IC Card Log in

Login processing is performed by obtaining an IC card number from an IC card that was held up to the IC card reader 208, and identifying a user.

Ordinarily a login service authenticates a user by verifying whether a user name and password, or an IC card number, which are obtained by the keyboard login or the IC card login, match something that is registered in the user database 312. In addition, the login service may collaborate with a server for user authentication that is connected by a wired LAN. In such a case, the login service performs user authentication by verifying whether the obtained user name and password, or IC card number match something that is registered in the server. Using an LDAP (Lightweight Directory Access Protocol) server, Windows (trademark) Active Directory (trademark), an independent server, or the like can be considered for a server for user authentication.

In addition, the login service in the first embodiment is equipped with a guest login function. The guest login function, for example, displays a guest login button 406 on the login screen 401. When a press of the guest login button 406 is detected, a state in which a user can use the MFP 100 is entered, without performing authentication of the user. Note that configuration may be taken to have a portion of the functions of the MFP 100 become unusable when a guest has logged in. For example, the MFP settings button 411 is disabled so that a guest cannot perform a setting modification of the MFP 100. In addition, configuration may be taken to disable, for example, the print button 409 or the copy button 407 when letting a guest use print paper is not desired.

When a user logs in, the login service 309 generates an object that records information of the logged-in user, and stores it in the RAM 203. An object that records information of the logged-in user is referred to as a login context 311 below. An example of information recorded in the login context 311 is illustrated in Table 2 below.

TABLE 2

| Item | Value |
| --- | --- |
| User name | Alice |
| Domain name | localhost |
| Role | General user |

A region to record a domain name is provided in the login context 311, and configuration is taken such that it is possible to distinguish, as separate accounts, a user account registered in the user database 312, and a user account managed by the server for user authentication. For example, if a user (Alice) who is registered in the user database 312 logs in, a character string "localhost" is recorded in the region that records the domain name. Alternatively, if logging in with a user account managed by the server for user authentication, the domain name or the server name is recorded as a character string in the region that records the domain name. An example of information recorded in the login context 311 when logging in with a user account that is managed by a server is illustrated in Table 3 below. Table 3, for example indicates a case in which a user (Alice) who is registered in the user database 312 has logged-in with a user account that is managed by a server, and a domain name (DomainA) is recorded in the region that records the domain name.

TABLE 3

| Item | Value |
| --- | --- |
| User name | Alice |
| Domain name | DomainA |
| Role | General user |

In addition, Table 4 illustrates an example of information recorded in the login context 311 at a time of a guest login.

Here the user name is set to "Alice", the domain name is set to "localhost", and the role is set to "guest".

TABLE 4

| Item | Value |
| --- | --- |
| User name | Alice |
| Domain name | localhost |
| Role | guest |

When a press of a logout button 412 of a screen displayed on the console unit 205 illustrated in FIG. 4 is detected, the information recorded in the login context 311 is deleted, and display of the login screen 401 is returned to again.

Figure 3B:
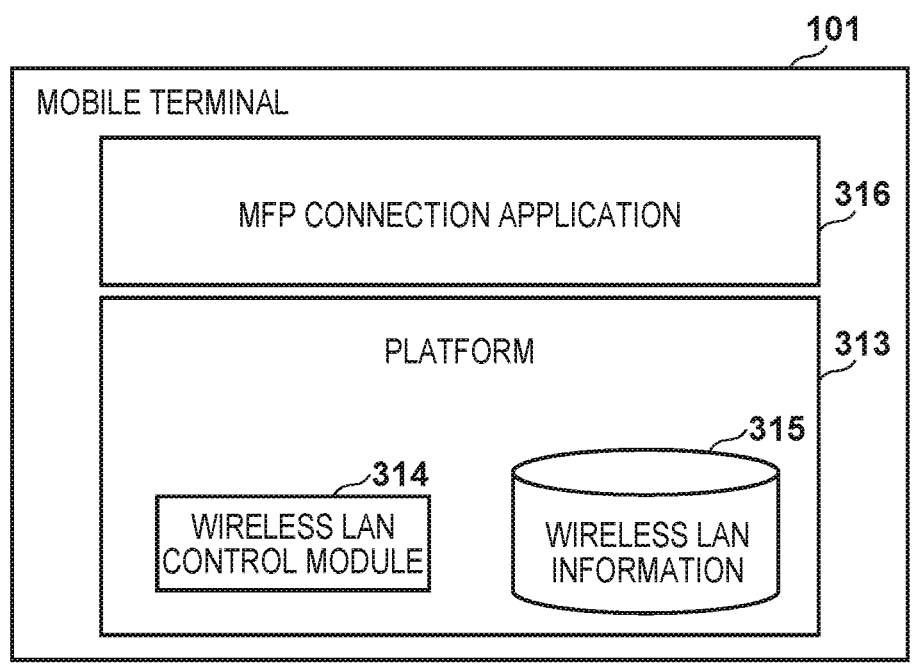
FIG. 3B is a block diagram for describing a software configuration of a mobile terminal according to the first embodiment and a data region in which software is managed.
Figure 5:
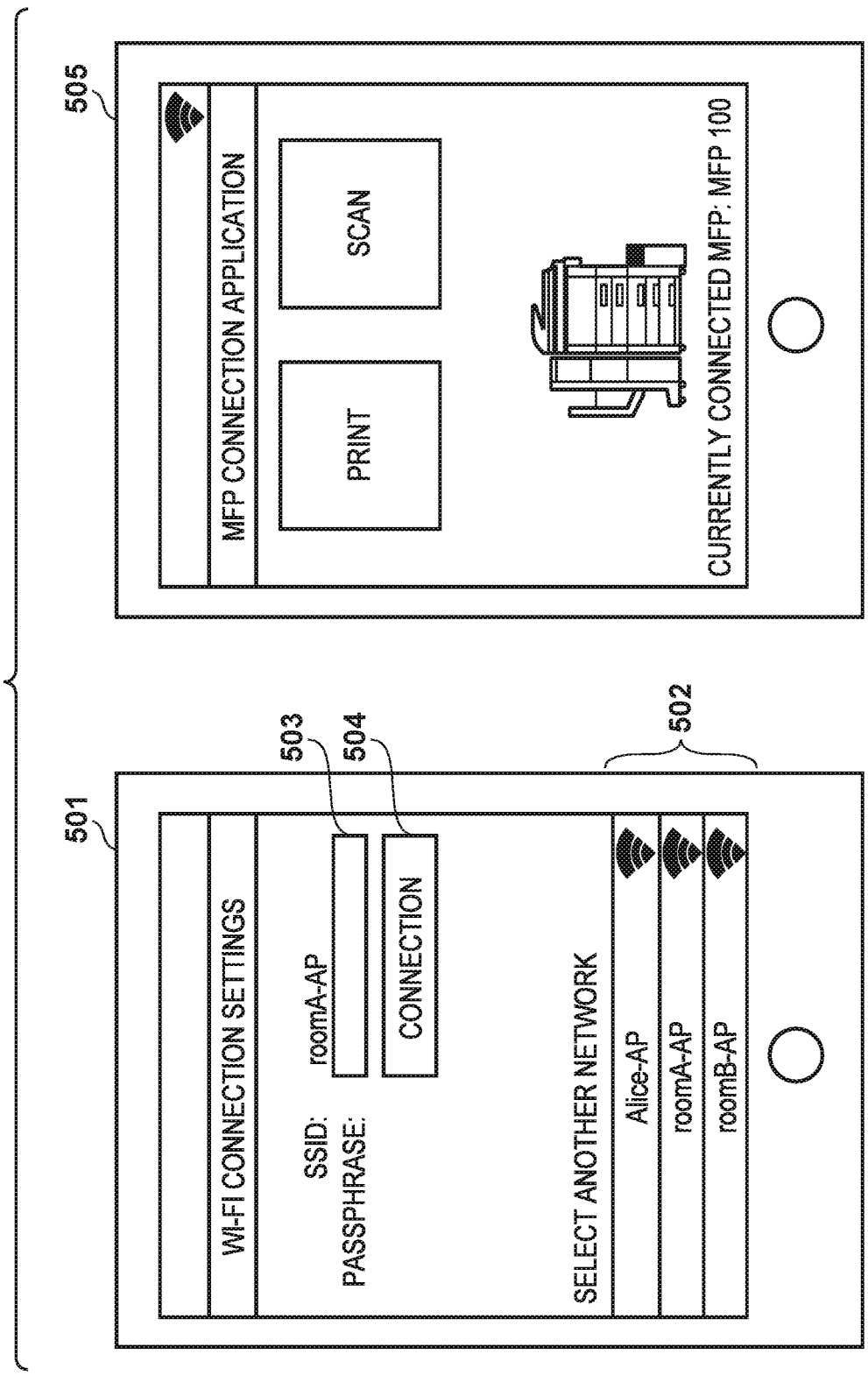
FIG. 5 depicts a view illustrating an example of user interfaces displayed on an operation unit of the mobile terminal according to the first embodiment.

FIG. 3B is a block diagram for describing a software configuration of the mobile terminal 101 according to the first embodiment and a data region in which software is managed. FIG. 5 depicts a view illustrating an example of user interfaces displayed on the operation unit 215 of the mobile terminal 101 according to the first embodiment. Below, explanation is given with reference to FIG. 3B and FIG. 5. Note, a function of software illustrated in FIG. 3B is realized by the CPU 211 executing a program deployed into the RAM 212.

Wireless LAN information 315 indicates a data region of data that software records in the flash memory 213 and manages. A platform 313 can be configured by a platform of Google Inc.'s Android (trademark) or Apple Inc.'s iOS (trademark), for example. The platform 313 is equipped with a device driver group for controlling various hardware, and provides APIs for using the various hardware to applications that operate on the platform 313. The platform 313 is equipped with a wireless LAN control module 314. The wireless LAN control module 314 is software that controls the wireless LAN interface 214. A wireless LAN setting screen 501 of FIG. 5 illustrates an example of a wireless LAN setting screen that the platform 313 displays on the operation unit 215. For example, it displays, in a list 502, wireless LAN access point SSIDs that the wireless LAN control module 314 has found by searching. A user selects any access point from the list 502, inputs a passphrase of the access point in an area 503, and then presses a connection button 504. In this way, when a connection succeeds, the platform 313 records the SSID and the passphrase in the wireless LAN information 315. When the wireless LAN function of the mobile terminal 101 is enabled and it is not connected to a wireless LAN, the platform 313 automatically searches for a wireless LAN access point to which there was a connection in the past. It is equipped with a function that attempts to connect by an SSID and a passphrase recorded in the wireless LAN information 315.

The mobile terminal 101 can install and cause to operate on the platform 313 various applications. In the first embodiment, an MFP connection application 316 is installed in advance. A user interface screen 505 of FIG. 5 illustrates an example of a user interface screen that the MFP connection application 316 displays on the operation unit 215. For example, the MFP connection application 316, after connecting to the MFP 100 by a wireless LAN, can use a function of the printer 206 or the scanner 207 of the MFP 100 via the wireless LAN. For example, it is possible to instruct printing to the MFP 100 by a user touching a print button in the screen 505.

Figure 6:
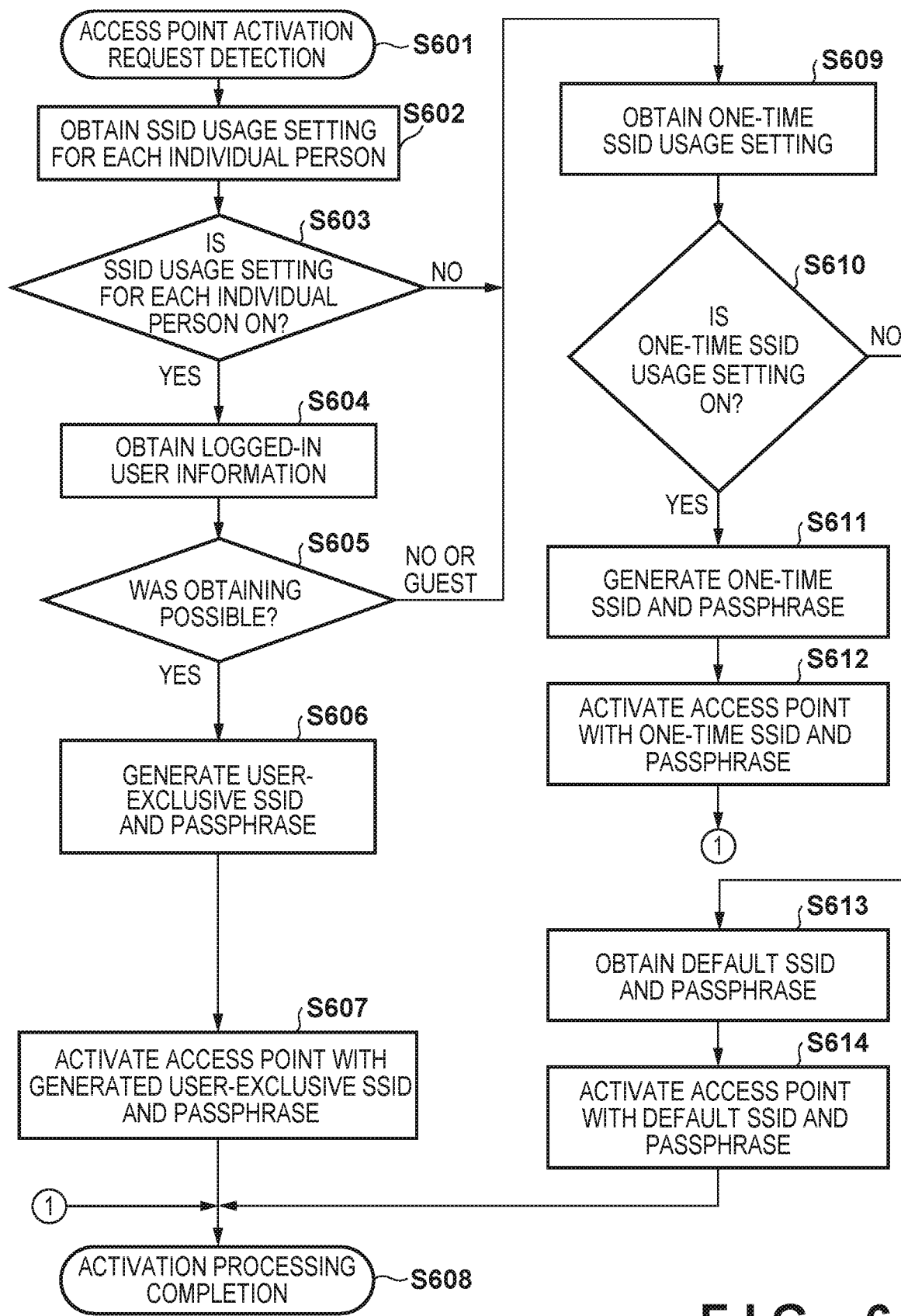
FIG. 6 is a flowchart for describing processing for activation of an access point by the MFP according to the first embodiment.

FIG. 6 is a flowchart for describing processing for activation of an access point by the MFP 100 according to the first embodiment. Note that a program that executes this processing is stored in the ROM 202 or the HDD 204, and at a time of execution, is deployed to the RAM 203, and executed under the control of the CPU 201. In addition, the performer of the software that executes this flowchart is the wireless LAN control module 302, which is illustrated in the software configuration of FIG. 3A.

In this processing, when a user presses the activate access point button 413 in the connecting mobile device screen 403, the mobile connection 306 requests the wireless LAN control module 302 to activate an access point. In this way the processing is started in step S601 by the wireless LAN control module 302 accepting an activation request for the access point. Note that, configuration may be taken such that, when the access point is already activated, the processing is started after stopping the currently activated access point.

Next, the processing proceeds to step S602 and the CPU 201 refers to the MFP setting database 310, and obtains the "SSID usage setting for each individual person" 419, which is set via the setting screen 404 of the MFP. The processing proceeds to step S603, and the CPU 201 determines whether or not the setting 419 obtained in step S602 is ON. Here, if the "SSID usage setting for each individual person" is ON, in other words if it is set so as to cooperate with the user login function to activate the access point with a different SSID for each user, the processing proceeds to step S604. In step S604 the CPU 201 refers to the login context 311, and attempts to obtain logged-in user information. The processing proceeds to step S605, and the CPU 201 determines whether or not information of a logged-in user could be obtained. If obtainment of information of a logged-in user other than a guest succeeded, the processing proceeds to step S606, and the CPU 201 generates an exclusive SSID and passphrase for the obtained user. Note that, to generate an exclusive SSID and passphrase for the logged-in user at this point, configuration may be taken to employ an algorithm such that the same SSID and passphrase are always generated if the obtained user information is the same. A method that always generates the same SSID and passphrase for each individual person from the user information is explained later. The processing proceeds to step S607, and the CPU 201 activates the access point by the generated or obtained SSID and passphrase. The processing proceeds to step S608, and the CPU 201 terminates the activation processing for the access point.

Meanwhile, if it is determined that the "SSID usage setting for each individual person" 419 is OFF in step S603, or if the logged-in user information indicates a guest in step S605, or if logged-in user information could not be obtained, the processing proceeds to step S609. In step S609, the CPU 201 refers to the MFP setting database 310, and obtains the "one-time SSID usage setting" 418. Next the processing proceeds to step S610, and the CPU 201 determines whether or not the obtained setting 418 is ON. Here, if the CPU 201 determines that the "one-time SSID usage setting" 418 is ON, in other words that it is a setting for activating an access point with a different SSID each time, the processing proceeds to step S611. In step S611 the CPU 201 uses a random number generator to generate, each time, a random SSID and passphrase as a one-time SSID and passphrase. Then the processing proceeds to step S612, and the CPU 201 activates the access point with the generated one-time SSID and passphrase. Then, the processing proceeds to step S608, and the activation processing for the access point is terminated.

If in step S610 the CPU 201 determines that the "one-time SSID usage setting" 418 is OFF, the processing proceeds to step S613, and the CPU 201 refers to the MFP setting database 310, and obtains a default SSID and passphrase. Next, the processing proceeds to step S614, and the CPU 201 activates the access point by the default SSID and passphrase. Then, the processing proceeds to step S608, and the activation processing for the access point is terminated. Note that the SSID and passphrase of the activated access point may be displayed on the connecting mobile device screen 403 of FIG. 4.

However, control is performed so as to not display the SSID and passphrase for a user on the connecting mobile device screen 403, even if an access point is activated, if a guest or another person has logged-in, or if the login function is changed to OFF so that they cannot be viewed by another person.

Note that, in the above-described flowchart, configuration may be taken to proceed to step S609 if the logged-in user information obtained in step S604 indicates a guest. However, when treating a guest account the same as a normal account, configuration may be taken such that the processing proceeds to step S606, and an exclusive SSID and passphrase for a guest are generated or obtained.

In addition, if a login function setting 416 of the MFP 100 is OFF, because obtaining logged-in user information is determined to have failed in step S605, even if the SSID usage setting for each individual person 419 is ON, SSID for each individual person will not be used.

Figure 7:
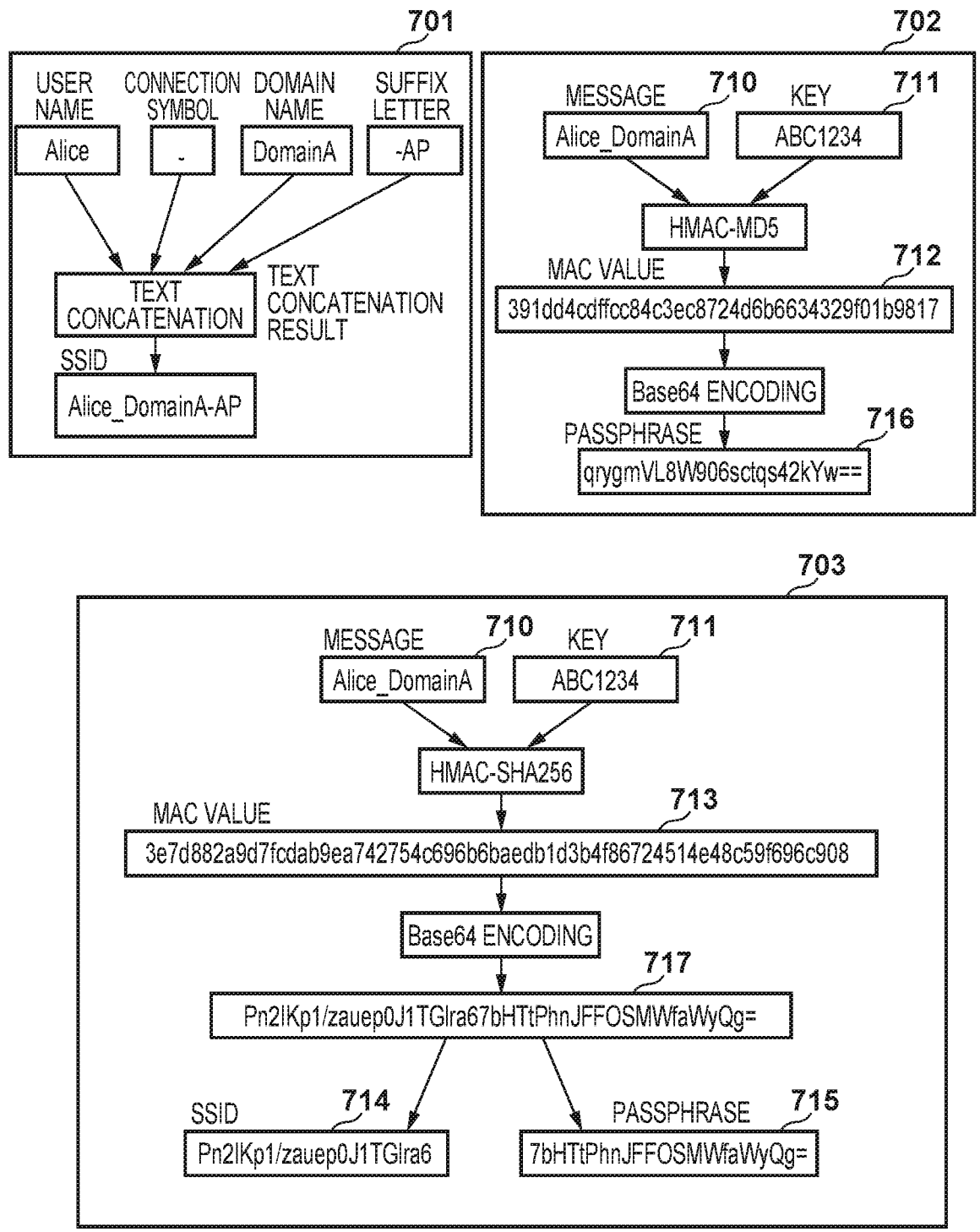

FIG. 7 depicts a view for explaining an algorithm by which the same SSID and passphrase are generated when information of a logged-in user is the same as information of a user who was logged-in previously in the MFP 100 according to the first embodiment. Note that the following explanation is only an example, and an approach to generation is not limited to this.

If a user name and a domain name are used for an SSID for example, it is possible to generate an SSID that is easy to understand for a user. For example, reference number 701 illustrates an example of generating an SSID as one character string by adding a fixed connection symbol (-) to a user name and a domain name, and adding suffix letters (-AP).

When desiring to have the user-exclusive passphrase, or both of the SSID and the passphrase, be something confidential so that guessing by another person is not possible, a method such as the following may be considered. For example, as illustrated by reference numeral 702 or reference numeral 703 of FIG. 7, a character string that includes a user name and a domain name is set as a message 710 and a value unique to the MFP is set as a key 711, and an HMAC (Hash-based Message Authentication Code) algorithm known by RFC 2104 is used to calculate MAC (Message Authentication Codes) values 712 and 713. Next, these MAC values are converted to character strings, and used as the SSID and the passphrase. In the example of reference numeral 702, a case in which an HMAC is used to generate only a passphrase 716 is illustrated. Also, in the example of reference numeral 703, an example of a case in which an HMAC is used to generate both an SSID 714 and a passphrase 715 is illustrated. In the example of reference numeral 703, a long string 717 is generated, a front part of the string is set as the SSID 714, and a rear part of the string is set as the passphrase 715.

In addition, configuration may be taken such that, if there are a plurality of the MFPs according to the first embodiment in the same office, key information used for HMAC is shared by the plurality of MFPs, and if the user information is the same, the same SSID and passphrase are generated. Thus, when the same SSID and passphrase can be used in a plurality of MFPs, it is possible to reduce a burden of a user in registering, in the mobile terminal 101, SSIDs and passphrases that are different for each MFP. In addition, if a user cannot simultaneously use a plurality of MFPs, no problem occurs because there is no case of access points having the same SSID and passphrase simultaneously activating in the plurality of MFPs.

By the first embodiment, as explained above, in a case where a user logs in to an MFP and activates an access point, it is possible to activate the access point by an SSID and passphrase that are exclusive to the logged-in user. At this point, because the SSID and passphrase that are exclusive to the user do not change when the access point activates or stops, it is always possible to use the same SSID and passphrase if the user is the same. Thereby, because registration of an SSID and a passphrase to the mobile terminal need only be performed once, it is possible to reduce effort for a user.

In addition, by configuring so that the SSID and passphrase that are exclusive to the user are not known by another person, a user who logs in to an MFP and activates an access point will not have the access point used by another person. With this, a user can temporarily monopolize an access point that the MFP has activated.

Furthermore, by using this function together with a function that automatically connects to an access point to which the mobile terminal connected in the past, it is possible to achieve a further effect. In other words, upon a user of a mobile terminal first registering and storing in the mobile terminal an SSID and passphrase exclusive to the user, the user can connect the mobile terminal and an MFP by just logging in to the MFP and activating the access point from the next time on.

In addition, even if the login function of the MFP is ON, there are cases in which a guest uses the MFP without performing user authentication. For this reason, configuration is taken to provide a temporary SSID and passphrase when a guest uses the access point of the MFP. Thus, even for a guest it is possible to monopolize an access point that an MFP has temporarily activated, without the access point being used by another person.

In addition, there are users who feel that setting the login function of an MFP to be always ON is cumbersome. For this reason, configuration is taken so that, when the login function is OFF, it is possible to use the access point of the MFP with a default SSID or a temporary SSID.

In addition, there are cases in which, when a number of terminals that actually use the access point of the MFP is less than the maximum number of terminals that can simultaneously connect, SSID for each individual person is not used, and the access point of the MFP may always be activated by a default SSID and passphrase. For this reason, configuration is taken such that it is possible to set the usage setting of SSIDs for each individual person to OFF.

Second Embodiment

Next, a second embodiment of the present invention is explained. The second embodiment is explained with a configuration that records, and manages, an SSID for each individual person in the HDD 204 of the MFP 100. Note that, because the hardware configuration, printing system's configuration, and the like of the mobile terminal 101 and the MFP 100 according to the second embodiment are the same as those of the previously described first embodiment, explanation thereof is omitted.

Figure 8:
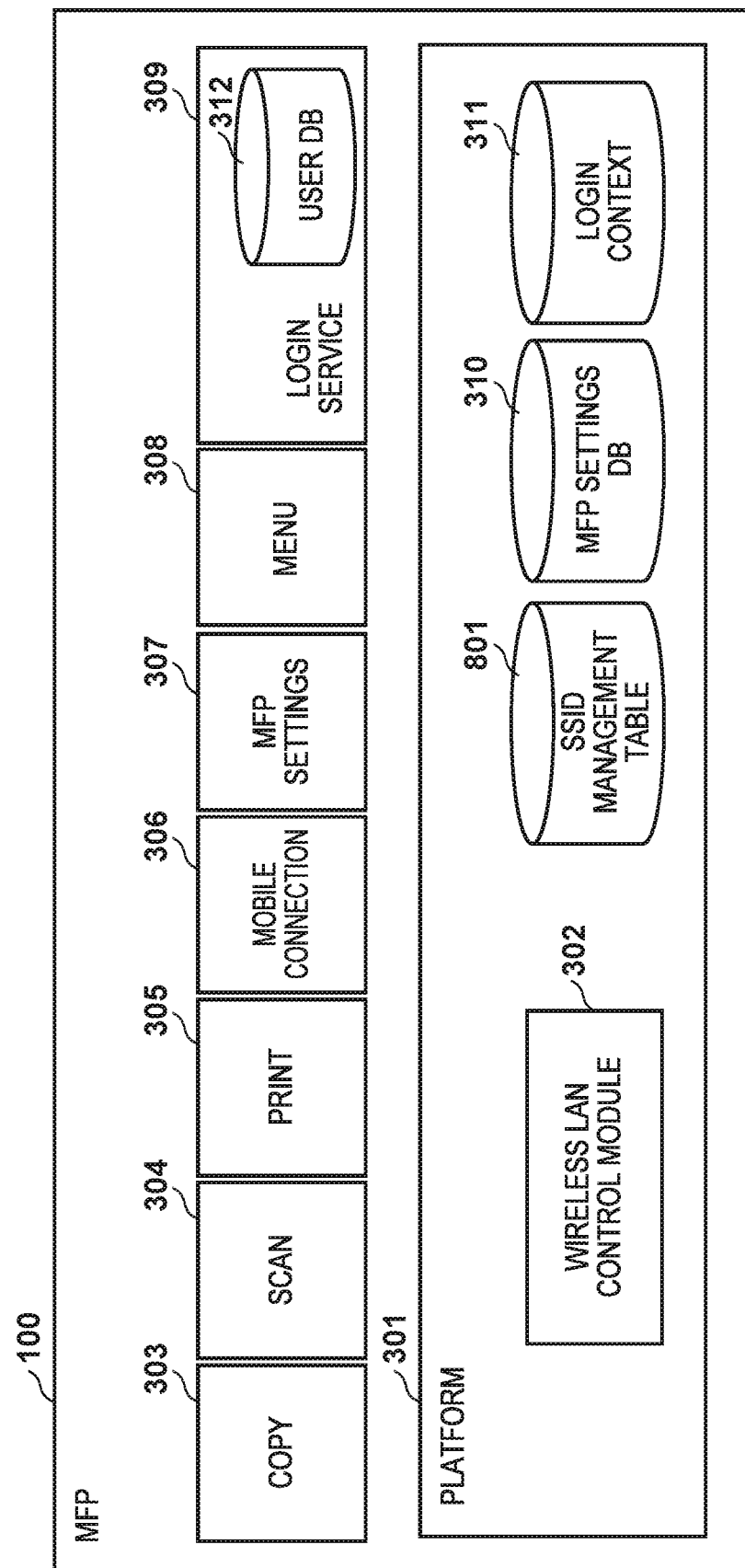
FIG. 8 is a block diagram for describing a software configuration of the MFP according to a second embodiment and a data region in which software is managed.

FIG. 8 is a block diagram for describing a software configuration of the MFP 100 according to the second embodiment and a data region in which software is managed. Also, portions in common with FIG. 3A of the previously described first embodiment are indicated by the same reference numerals, and explanation thereof is omitted.

Here, the platform 301 records and manages SSIDs for each individual person in an SSID management table 801 of the HDD 204. For example the SSID management table 801, as illustrated in Table 5 below, stores an SSID and passphrase in association with information that specifies a user uniquely (user name and domain name).

TABLE 5

| User name | Domain name | SSID | Passphrase |
|---|---|---|---|
| Alice | localhost | Alice-AP | XHIQo1IyS144q2D18Cz8xQ |
| Bob | localhost | Bob-Ap | FPkxZggmzC/+00LoTUVSSg |
| Carol | localhost | Carol-AP | Astpr0h/Y3XOIuOixRQriw |
| Dave | localhost | Dave-AP | EtCQweUnrw55NNI/P+wXvA |

Figure 9:
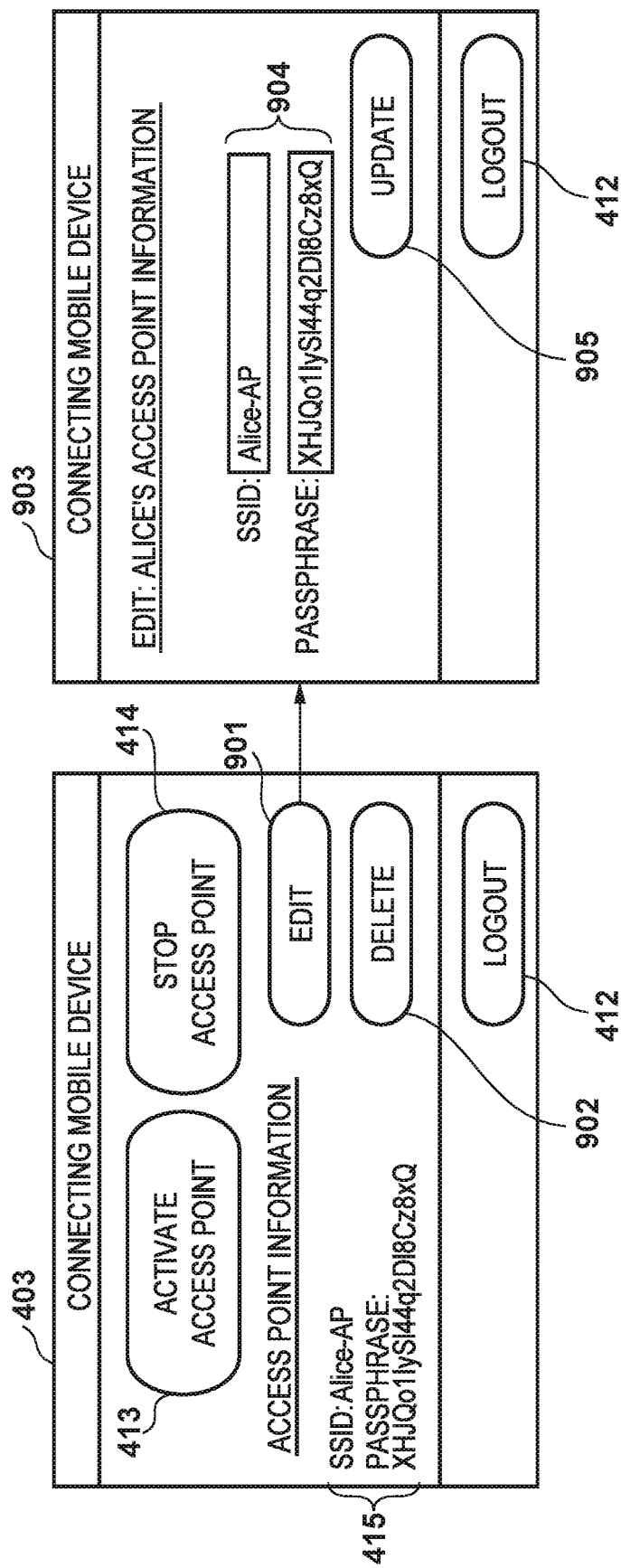
FIG. 9 depicts a view illustrating an example of user interfaces provided by a mobile connection corresponding to editing or deleting an SSID, in the second embodiment.

FIG. 9 depicts a view illustrating an example of user interfaces provided by the mobile connection 306 that correspond to editing or deleting an SSID, in the second embodiment. Note that, in FIG. 9, a portion in common with FIG. 4 has the same reference numeral added.

The mobile connection 306 refers to the login context 311 to specify a logged-in user, and furthermore obtains, from the SSID management table 801, an SSID and passphrase associated with the logged-in user, and displays them on the area 415.

In FIG. 9, the connecting mobile device screen 403 displays the access point information on the area 415, similarly to the previously explained FIG. 4. If there is no information of an SSID and passphrase associated with the logged-in user in the SSID management table 801, the area 415 is displayed as blank. Upon detection of a press of an edit button 901 of the connecting mobile device screen 403, the mobile connection 306 displays an editing screen 903 for editing the SSID and passphrase displayed in the area 415. A user can register a new SSID and passphrase by inputting the new SSID and passphrase in an area 904 of the editing screen 903 and then pressing an update button 905. At this point, the mobile connection 306 obtains the SSID and passphrase that have been newly input in the area 904, and registers them in or updates the SSID management table 801. In this way, it is possible to generate a new SSID by concatenating a predetermined character string to user identification information.

In addition, the connecting mobile device screen 403 is provided with a delete button 902. Upon detecting a press of the delete button 902 for the connecting mobile device screen 403, the mobile connection 306 deletes, from the SSID management table 801, information of the SSID and passphrase that are associated with the logged-in user.

Figure 10:
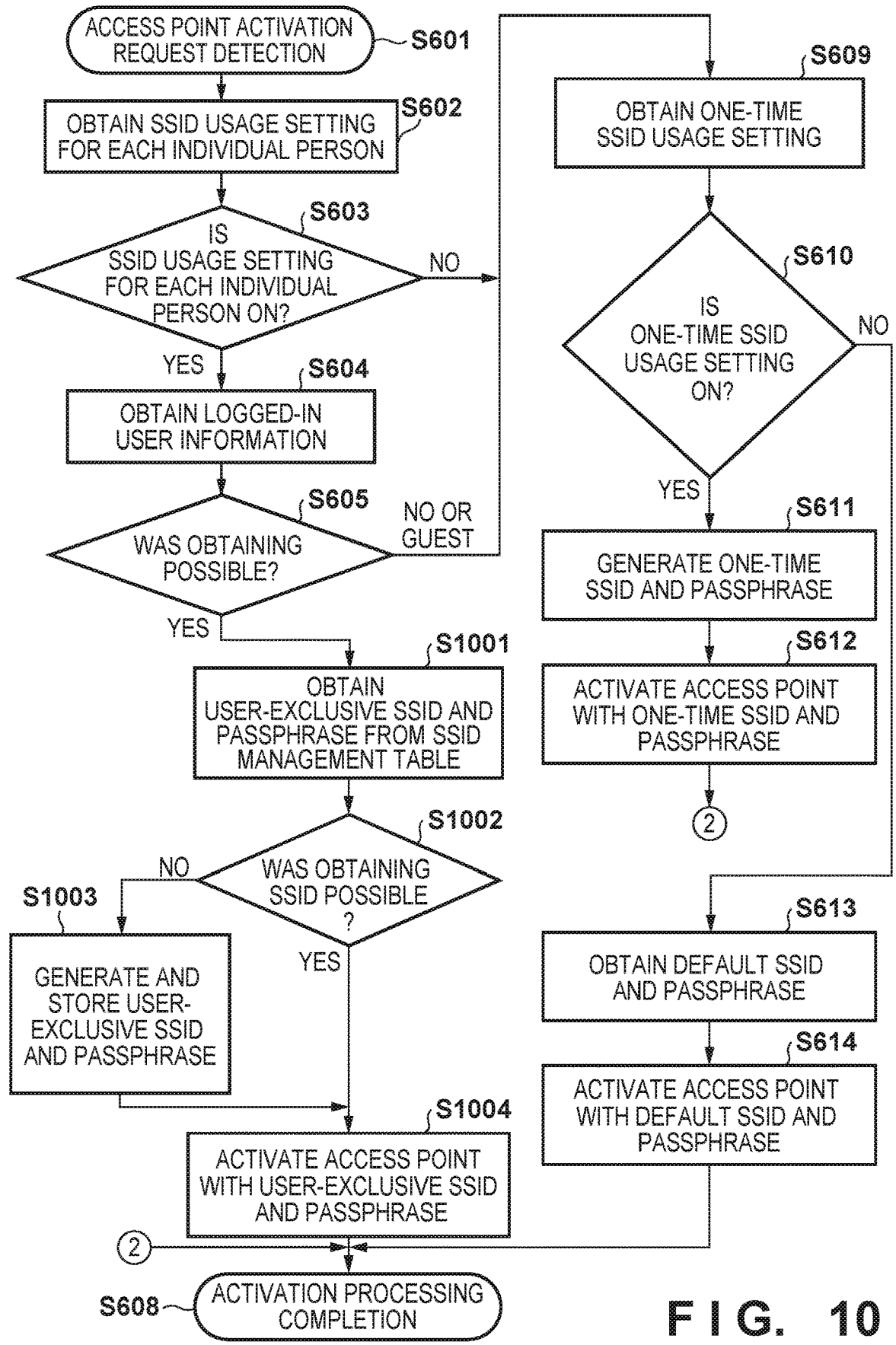
FIG. 10 is a flowchart for describing processing for activation of an access point by the MFP according to a second embodiment.

FIG. 10 is a flowchart for describing processing for activation of an access point by the MFP 100 according to the second embodiment. Note that a program that executes this processing is stored in the ROM 202 or the HDD 204, and at a time of execution, is deployed to the RAM 203, and executed under the control of the CPU 201. In addition, the performer of the software that executes this flowchart is the wireless LAN control module 302, which is illustrated in the software configuration of FIG. 8. Also, in FIG. 10, portions in common with the flowchart of FIG. 6 in accordance with the previously described first embodiment are illustrated by the same reference numerals.

In step S605, the CPU 201 determines whether or not it was possible to obtain information of a logged-in user from the login context 311. Upon determining that it is possible to obtain information of the logged-in user, the processing proceeds to step S1001, the CPU 201 refers to the SSID management table 801, and attempts to obtain an SSID and passphrase associated with the information of the logged-in user. The processing proceeds to step S1002, and the CPU 201 determines whether or not it succeeded in obtaining the SSID and the passphrase. Upon determined that obtainment failed here, the processing proceeds to step S1003, and as explained with reference to FIG. 7, the CPU 201 uses the information of the logged-in user to newly generate an SSID and passphrase. These are stored in the SSID management table 801 in association with information of the logged-in user, and the processing proceeds to step S1004. In step S1004, the CPU 201 uses the SSID and passphrase generated in step S1003 to activate the access point to complete the access point activation processing.

Meanwhile, if in step S1002 the CPU 201 succeeded in obtaining the SSID and the passphrase, the processing proceeds to step S1004. In step S1004, the CPU 201 uses the SSID and passphrase obtained from the SSID management table 801 to activate the access point to complete the access point activation processing.

According to the second embodiment, as explained above, if an SSID and passphrase are not stored in the SSID management table 801, an SSID and passphrase are newly generated, stored in the SSID management table 801, and that are used to activate the access point. However, if there are an SSID and passphrase that are already stored, they are used to activate the access point. Thereby, it is possible to reduce a burden on a CPU in accordance with generation of the SSID and passphrase.

In addition, by allowing a user to edit their own SSID and passphrase, the user can freely set a desired SSID and passphrase, and MFP convenience increases. In addition, even if an SSID and passphrases for each individual person are leaked to another person, because a user can change or delete the SSID and passphrase at any timing, it is possible to maintain security of the MFP.

OTHER EMBODIMENTS

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-81232, filed Apr. 10, 2015, which is hereby incorporated by reference herein in its entirety.

What is claimed is:

1. A communication apparatus equipped with a direct wireless communication function for executing a direct wireless communication with an external apparatus without a relay apparatus, the communication apparatus comprising:
   at least one memory that stores a set of instructions; and
   at least one processor that executes the instructions, the instructions, when executed, causing the information processing apparatus to perform operations comprising:
      specifying a user who logs into the communication apparatus; and
      executing a direct wireless communication function,
   wherein an SSID of a plurality of SSIDs including at least an SSID of a first type corresponding to the user who logs into the communication apparatus and an SSID of a second type being different from the SSID of the first type is able to be used in the direct wireless communication function,
   wherein in a case that it is set to use the SSID of the first type, an SSID corresponding to the specified user is used in the executed direct wireless communication function.

2. A method of controlling a communication apparatus equipped with a direct wireless communication function that executes a direct wireless communication with an external apparatus without a relay apparatus, the method comprising:
   specifying a user who logs into the communication apparatus; and
   executing a direct wireless communication function,
   wherein an SSID of a plurality of SSIDs including at least an SSID of a first type corresponding to the user who logs into the communication apparatus and an SSID of a second type being different from the SSID of the first type is able to be used in the direct wireless communication function,
   wherein in a case that it is set to use the SSID of the first type, an SSID corresponding to the specified user is used in the executed direct wireless communication function.

3. The method according to claim 2, wherein in a case that the direct wireless communication function is executed using the SSID of the first type, the communication apparatus functions as an access point that is identified by the external apparatus with the SSID corresponding to the specified user.

4. The method according to claim 3, wherein in a case that the direct wireless communication function is executed using the SSID of the first type, a passphrase corresponding to the specified user is set to the access point.

5. The method according to claim 2, further comprising:
   generating the SSID corresponding to the specified user using at least user information of the specified user.

6. The method according to claim 5, wherein the SSID corresponding to the specified user is generated by combining user information of the specified user with a predetermined character string.

7. The method according to claim 2, wherein the direct wireless communication function is a function in which the communication apparatus operates as an access point.

8. The method according to claim 2, wherein the direct wireless communication function is Wi-Fi Direct®.

9. The method according to claim 2, wherein the communication apparatus is a printing apparatus that can execute printing.

10. The method according to claim 2, wherein the SSID of the second type is an SSID that is obtained from information other than user information of the specified user.

11. The method according to claim 2, wherein the SSID of the second type is one-time SSID.

12. The method according to claim 11, wherein the one-time SSID is an SSID of one time period used between a start and an end of the direct wireless communication and includes character string generated based on an acceptance of an instruction for instructing to execute the direct wireless communication function.

13. The method according to claim 12, wherein the one-time SSID includes a random character string generated based on the acceptance of the instruction.

14. The method according to claim 11, wherein in a case that the one time SSID is used in the direct wireless communication function, an SSID that is different from a previous SSID which is generated previously is used in the executed direct wireless communication function.

15. The method according to claim 11, wherein the plurality of SSIDs further include an SSID of a third type,
wherein in a case that it is set to use the SSID of the third type, a default SSID that is stored as an operation setting for the direct wireless communication is used in the executed direct wireless communication function.

16. The method according to claim 15, the method further comprising:
changing the stored default SSID in accordance with a user operation.

17. A non-transitory computer-readable storage medium storing a program for causing a processor to execute a method of controlling a communication apparatus equipped with a direct wireless communication function that executes a direct wireless communication with an external apparatus without a relay apparatus, the method comprising:
specifying a user who logs into the communication apparatus; and
executing a direct wireless communication function,
wherein an SSID of a plurality of SSIDs including at least an SSID of a first type corresponding to the user who logs into the communication apparatus and an SSID of a second type being different from the SSID of the first type is able to be used in the direct wireless communication function,
wherein in a case that it is set to use the SSID of the first type, an SSID corresponding to the specified user is used in the executed direct wireless communication function.

* * * * *